(12) United States Patent
Nifenecker et al.

(10) Patent No.: US 11,965,440 B2
(45) Date of Patent: Apr. 23, 2024

(54) PART FOR A TURBOMACHINE CENTRIFUGAL BREATHER HAVING A FILTERING MESH

(71) Applicant: SAFRAN, Paris (FR)

(72) Inventors: Arnaud Georges Nifenecker, Moissy-Cramayel (FR); Benjamin Nicolas Fulleringer, Moissy-Cramayel (FR); Cédric Jean Daniel Plaino, Moissy-Cramayel (FR); Xavier Roger Betbeder-Laüque, Moissy-Cramayel (FR)

(73) Assignee: SAFRAN, Paris (FR)

( * ) Notice: Subject to any disclaimer, the term of this patent is extended or adjusted under 35 U.S.C. 154(b) by 650 days.

(21) Appl. No.: 17/257,254

(22) PCT Filed: Jul. 5, 2019

(86) PCT No.: PCT/FR2019/051670
§ 371 (c)(1),
(2) Date: Dec. 30, 2020

(87) PCT Pub. No.: WO2020/008156
PCT Pub. Date: Jan. 9, 2020

(65) Prior Publication Data
US 2021/0231034 A1      Jul. 29, 2021

(30) Foreign Application Priority Data

Jul. 5, 2018  (FR) ........................................ 1856182
May 24, 2019 (FR) ........................................ 1905476

(51) Int. Cl.
*B01D 53/22*   (2006.01)
*B01D 45/14*   (2006.01)
(Continued)

(52) U.S. Cl.
CPC .............. *F01M 11/08* (2013.01); *B01D 45/14* (2013.01); *F01D 25/18* (2013.01); *F01M 11/03* (2013.01);
(Continued)

(58) Field of Classification Search
CPC ........... F01M 11/08; F01M 2013/0422; F01M 11/03; F01M 13/04; F05D 2220/32;
(Continued)

(56) References Cited

U.S. PATENT DOCUMENTS 309,663 A * 12/1884 Stout
2,529,398 A * 11/1950 Savin ..................... F01M 11/03
                                                    210/438

(Continued)

FOREIGN PATENT DOCUMENTS

EP    0626503 A1    11/1994
EP    2156941 A1    2/2010
EP    2463008 A1    6/2012

OTHER PUBLICATIONS

International Search Report and English Translation received in corresponding international application No. PCT/FR2019/051670, filed Jul. 5, 2019, 7 pages.

(Continued)

*Primary Examiner* — Anthony R Shumate
(74) *Attorney, Agent, or Firm* — CHRISTENSEN O'CONNOR JOHNSON KINDNESS PLLC

(57) ABSTRACT

A part for a centrifugal breather for an air/oil mixture of a turbomachine is configured to rotate about a longitudinal axis of symmetry. The breather forms an annular chamber for centrifugal separation of said mixture. The chamber includes mesh structure that takes up at least one space in a duct which closes communication between an axial inlet and an internal radial outlet. The mesh structure is formed by the (Continued)

spatial repetition of the material or of the space of a single pattern produced by the interconnection of simple shapes. The pattern is designed such that the spaces between the materials paths passing through the materials in at least three dimensions of space forming a trihedron.

9 Claims, 8 Drawing Sheets

(51) Int. Cl.
| | | |
|---|---|---|
| *F01D 25/18* | (2006.01) | |
| *F01M 11/03* | (2006.01) | |
| *F01M 11/08* | (2006.01) | |
| *F01M 13/04* | (2006.01) | |
| *F02C 7/06* | (2006.01) | |

(52) U.S. Cl.
CPC ............... *F01M 13/04* (2013.01); *F02C 7/06* (2013.01); *F01M 2013/0422* (2013.01); *F05D 2220/32* (2013.01); *F05D 2260/98* (2013.01)

(58) Field of Classification Search
CPC ..... F05D 2260/98; F01D 25/18; B01D 45/14; F02C 7/06
See application file for complete search history.

(56) References Cited

U.S. PATENT DOCUMENTS

| | | | | |
|---|---|---|---|---|
| 2,747,367 A * | 5/1956 | Savin, Jr. | ................... | F02C 7/32 |
| | | | | 415/199.5 |
| 2,942,662 A * | 6/1960 | Goodwillie | ............... | D21F 9/04 |
| | | | | 162/368 |
| 5,429,208 A | 7/1995 | Largillier et al. | | |
| 5,731,817 A * | 3/1998 | Hahs, Jr. | ................. | G06T 17/20 |
| | | | | 345/423 |
| 5,760,779 A * | 6/1998 | Yamashita | .............. | G06T 17/20 |
| | | | | 345/421 |
| 6,033,450 A | 3/2000 | Krul et al. | | |
| 2004/0098956 A1 | 5/2004 | Care et al. | | |
| 2005/0211093 A1 | 9/2005 | Latulipe et al. | | |
| 2005/0228804 A1 * | 10/2005 | Kataoka | .................. | G06F 30/23 |
| 2009/0084633 A1 * | 4/2009 | Fujimoto | ................. | F01M 1/10 |
| | | | | 184/6.5 |
| 2011/0314830 A1 * | 12/2011 | Legare | .................... | F01D 25/20 |
| | | | | 60/39.08 |
| 2016/0138444 A1 * | 5/2016 | Prunera-Usach | ...... | F01M 13/04 |
| | | | | 74/431 |
| 2018/0264383 A1 * | 9/2018 | Bisurkar | .............. | B01D 35/147 |
| 2020/0316506 A1 * | 10/2020 | Pereira | .................. | B01D 45/12 |
| 2021/0197885 A1 * | 7/2021 | Amano | ................ | B62D 5/0403 |

OTHER PUBLICATIONS

Written Opinion received in corresponding international application No. PCT/FR2019/051670, filed Jul. 5, 2019, 9 pages.
Gaillard, Y. et al., "Tech Hour Mousses metalliques par voie de fonderie et structures lattices Nov. 29, 2016", Nov. 2016, pp. 1-45, XP055628182, downloaded from the Internet, <https://www.nae.fr/wp-content/uploads/2018/04/TechHour_Lattice_20161129_NAE.pdf>, extracted Oct. 2, 2019.
Blanchet, M., "Conference Alveotec du Mar. 21, 2014", Mar. 2014, pp. 1-37, XP055628187, downloaded from the Internet, <http://www.alveotec.fr/fichiers/htmlEditor/les%mousses%20metalliques,%20fabrications%20et%20applications%20-2.pdf>, extracted Oct. 2, 2019.
Gonzalez-Garcia, J., et al., "Charecterization of a Carbon Felt Electrode: Structural and Physical Properties", Journal of Materials Chemistry, Royal Society of Chemistry, 9(2) Feb. 1999, pp. 419-426, XP000831075.

* cited by examiner

[Fig.1]
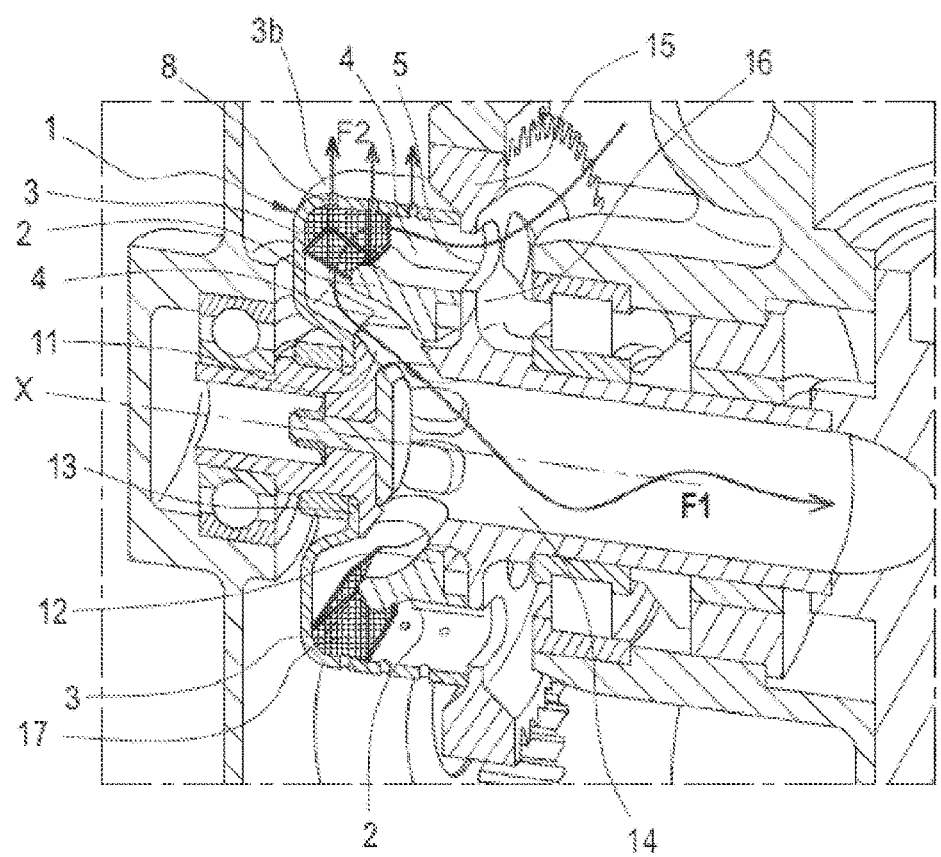

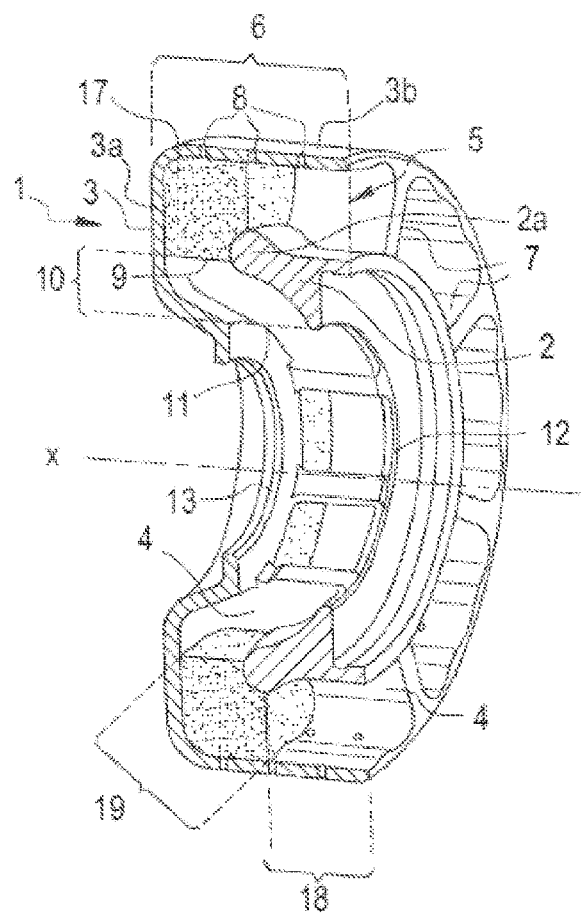
[Fig.2]

[Fig.3]
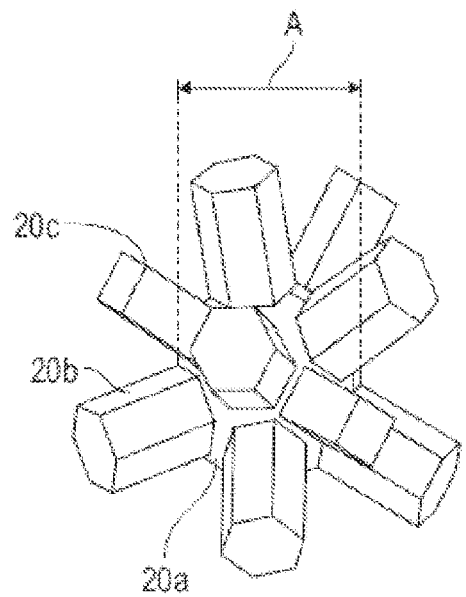
[Fig.4]
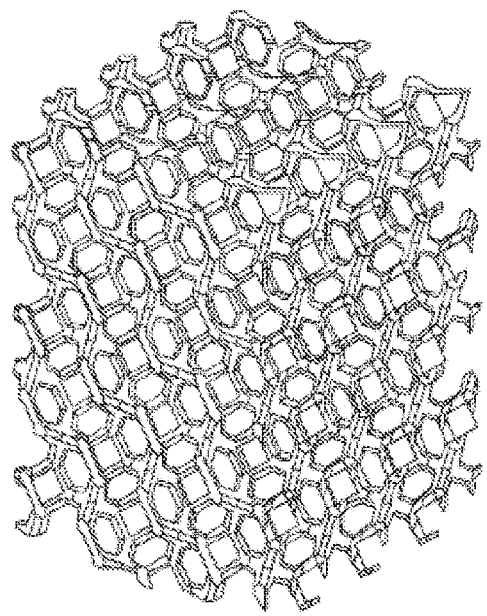

[Fig.5]
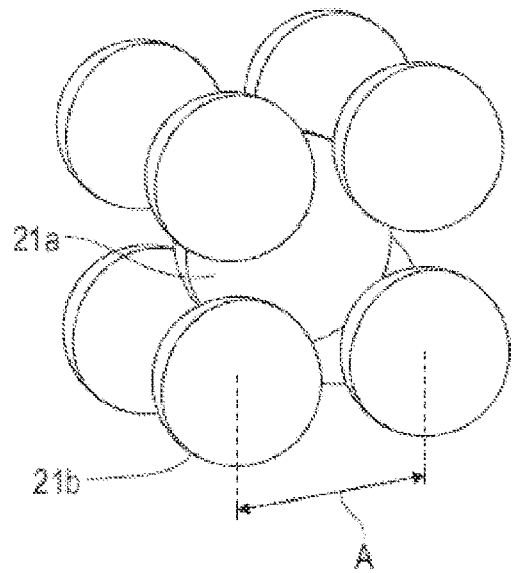
[Fig.6]
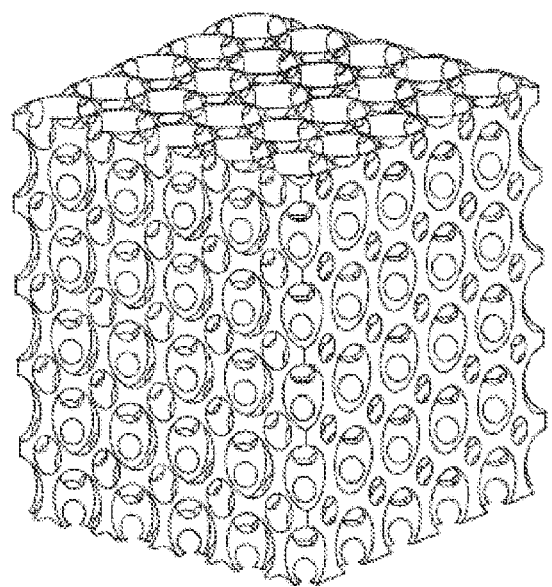

[Fig.7]
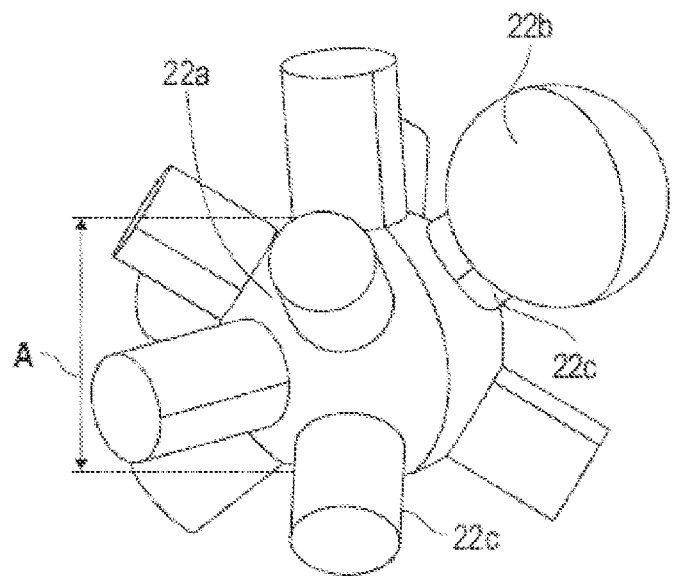
[Fig.8]
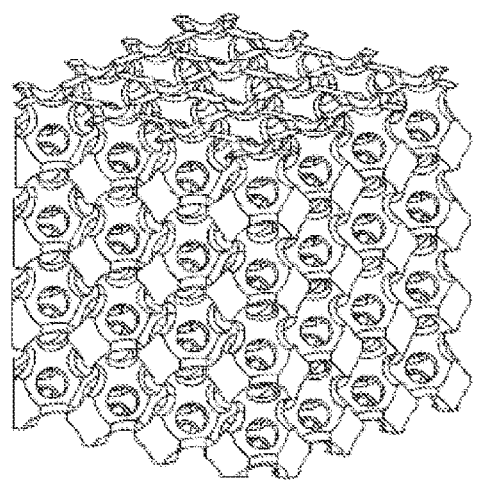

[Fig.9]
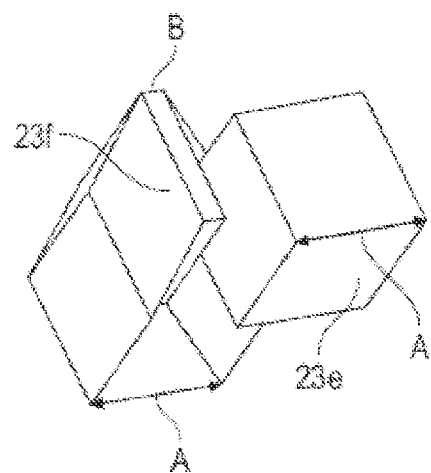
[Fig.10]
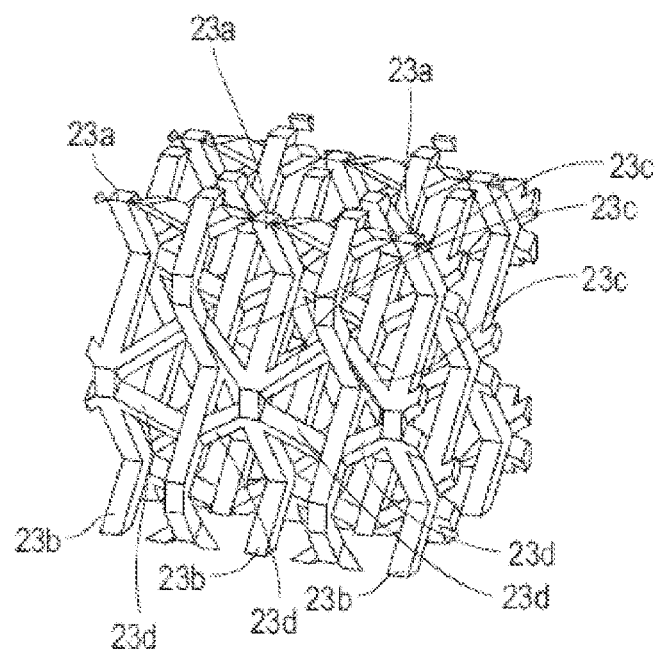

[Fig.11]
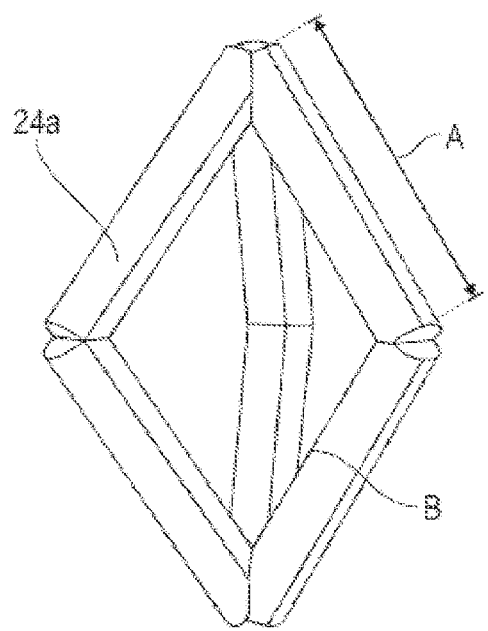
[Fig.12]
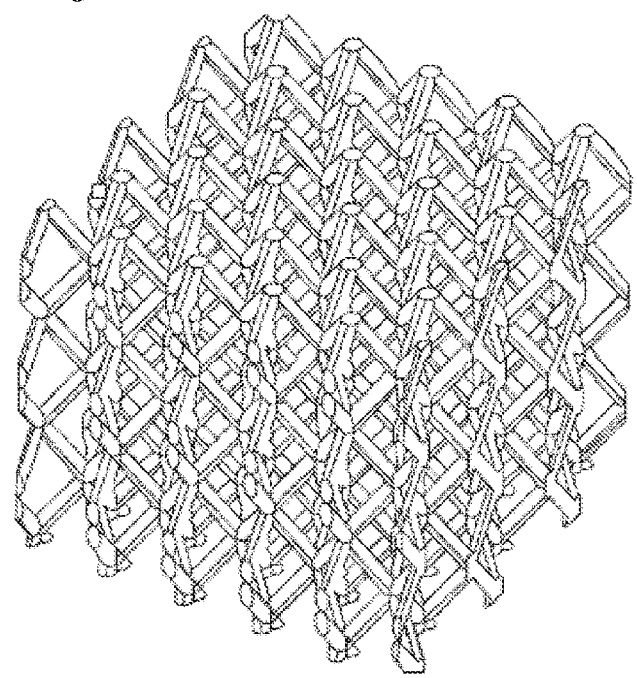

[Fig.13]
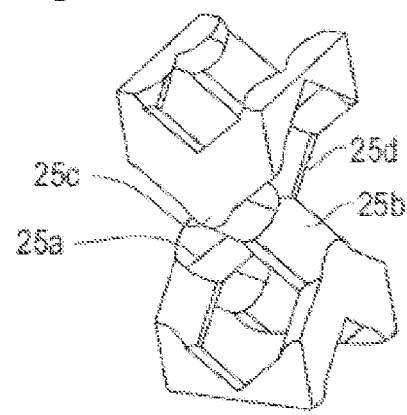

PART FOR A TURBOMACHINE CENTRIFUGAL BREATHER HAVING A FILTERING MESH

FIELD OF THE DISCLOSURE

The disclosure relates in particular to a centrifugal breather of a turbomachine.

BACKGROUND

Turbomachines are a complex system that use a number of rotating assemblies (turbines, compressor, etc.) that must be equipped with sealing devices. These sealing devices are generally made by labyrinths of pressurised air arranged in the vicinity of the rotating assemblies. For this purpose, air is taken directly from the air duct of the turbomachine. This air then passes through the turbomachine via the various labyrinths provided for this purpose, and is then evacuated to the outside of the turbomachine to limit the rise in pressure in the other areas of the turbomachine, in particular the reduction gearbox, accessory gearbox, etc. This air, which has passed through different areas of the turbomachine, is charged with oil used for cooling and lubricating the bearings and pinions of the rotating assemblies. In order to avoid the discharge of oil-laden air, to reduce the ecological impact of the turbomachines, to reduce oil consumption and to limit the filling of oil reserves, it is important to provide breathers which allow the oil to be separated from the air before discharging the air to the outside of the turbomachine.

Such a breather is usually fitted and driven by a mechanical power take-off at the accessory box or reduction gearbox of the turbomachine.

In a known manner, such a centrifugal breather comprises one or more centrifugal air/oil mixture separation enclosures arranged around a hollow shaft and delimited by an external annular wall and an inner annular wall. The breather also comprises an axial inlet for supplying the enclosure with the air/oil mixture, and a peripheral oil outlet provided in the outer wall. Thus, when the breather is set in rotation, usually by means of a pinion in the accessory gearbox or reduction gearbox, the oil is naturally centrifugally driven to the oil outlet provided on the periphery of the breather. In addition, an oil-free air outlet is formed in the inner wall and connected to the hollow shaft, which allows the air to be discharged to the outside.

Some breathers, such as the one described in application WO-A1-2011/004023, also comprise filters arranged in the breather enclosure to improve the collection of oil drops and thus promote the de-oiling of the mixture. In fact, the filters increase the available contact surface and therefore improve the probability that a drop of oil carried by the mixture flow will be caught on a wall. These filters are usually made of a metal foam, such as a foam marketed under the name RETIMET®.

However, the performance of known breathers is generally handicapped by internal pressure drops which are due to two causes in particular, the shape of the duct, including the centrifuge enclosure, taken by the air flow during de-oiling, and the presence of the metal foam.

With regard to the internal shapes of the breather delimiting the duct taken by the air flow, the manufacturing process can then be limiting as to the potential for optimal geometry to be achieved.

As far as the presence of metal foam is concerned, the pressure losses are due to the fact that at high speeds (for example at speeds of around 6000 rpm), the front surface formed by the metal foam acts like a wall and the degree of penetration of the air particles into the foam is low.

There is therefore a need to improve the design of the centrifugal separation enclosure to optimise de-oiling performance while limiting the pressure drop across the breather.

SUMMARY

For this purpose, the disclosure concerns a part for a centrifugal breather for an air/oil mixture of a turbomachine, intended to rotate about an axis of symmetry, forming an annular enclosure for centrifugal separation of the mixture comprising an axially oriented inlet for feeding the mixture, a first radially inwardly oriented outlet for the exit of the oil-free air separated from the mixture and at least one second radially outwardly oriented oil outlet and intended to discharge the oil separated from the mixture to the outside of the breather, the enclosure further comprising at least one mesh structure occupying at least one space in the duct which closes off the communication between the axial inlet and the internal radial outlet.

The part is characterised in that the mesh structure is formed by spatial repetition, either for the material or for the void, of a single pattern produced by the interconnection of simple shapes to be chosen from among spheres or ovoids and bars of constant section, in particular circles, rectangles or octagons, the pattern being arranged so that the voids between the material communicate so as to organise paths crossing through the material in at least three dimensions of space forming a trihedron.

The studies have made it possible to validate the performance of the mesh realised on this principle to de-oil the mixture by centrifugation while minimising pressure losses. Numerous geometric variations around basic structures were used for this validation: variation in bar diameter, distance between geometric elements, bar length, replacement of circular section by other geometries (polyhedron type) and vice versa.

Furthermore, the repetition of a pattern defined by only a few geometric parameters is adapted to manufacturing methods such as additive manufacturing and makes the part easier to produce.

Preferably, the porosity of the mesh is between 70% and 95%.

The porosity is the ratio between void volume and material volume in the mesh. A high porosity limits pressure losses.

Advantageously, the pattern of the mesh provides at least one void volume containing a sphere or square with a diameter or side of between 1 mm and 2.5 mm, or the longitudinal extension of a material element of the pattern is between 1 mm and 2.5 mm.

Also advantageously, the transverse dimension of a void element or a material element is between 0.1 mm and 1 mm.

These dimensions are adapted so that oil droplets are captured along the material elements of the mesh without obstructing the passage of the mixture through the mesh. It should be noted that these parameters may change gradually in the mesh depending on the location in the part to take into account the state of the mixture as it travels through the breather.

According to an embodiment of a mesh according to the disclosure, the pattern of the voids is formed by spheres intersecting with a central sphere.

According to other embodiments, the pattern of the voids is formed by bars intersecting with a central sphere, a sphere of smaller diameter than the central sphere being connectable to at least one of the bars.

In other embodiments, the material pattern comprises a first series of bars oriented in a first direction and transversely staggered, having points of crossing with a second series of bars oriented in a second direction, transverse to the first direction, also transversely staggered, the pattern further comprising series of complementary bars connecting in a zig-zag manner crossing points in a row of bars of the first series, respectively the second series, with bars of the second series, respectively the first series, crossing the row, so as to create an entanglement of material around the voids.

In other embodiments, the material pattern comprises bars interconnected in hexahedrons.

In other embodiments, the material pattern comprises a node where two bars forming a first dihedron are connected to two further bars forming a second dihedron rotated substantially 90 degrees relative to the first dihedron along a common median axis.

Advantageously, the part is manufactured in one part, e.g., additive manufacture. This makes it possible to optimise the shapes of the part and to integrate the mesh into these shapes.

The disclosure also concerns a centrifugal breather for an air/oil mixture of a turbomachine comprising a part as described above, a hollow shaft integral with the part and configured to collect the air exiting of the internal radial outlet, and a pinion for rotating the assembly.

DESCRIPTION OF THE DRAWINGS

Other characteristics and advantages of the disclosure will appear during the reading of the detailed description which will follow, for the understanding of which reference will be made to the attached drawings in which:

FIG. 1 shows a schematic perspective view of a breather relative to the disclosure, cut according to a plane of symmetry;

FIG. 2 shows a partial schematic view in perspective and cut according to a plane of symmetry of a part manufactured according to the disclosure for the breather of FIG. 1;

FIG. 3 shows a schematic perspective view of the pattern of void volumes of a first embodiment of a mesh according to the disclosure to be installed in the part of FIG. 1;

FIG. 4 shows a schematic perspective view of a portion of a mesh corresponding to the pattern of FIG. 3;

FIG. 5 shows a schematic perspective view of the pattern of void volumes of a second embodiment of a mesh according to the disclosure to be installed in the part of FIG. 1;

FIG. 6 shows a schematic perspective view of a portion of a mesh corresponding to the pattern of FIG. 5;

FIG. 7 shows a schematic perspective view of the pattern of void volumes of a third embodiment of a mesh according to the disclosure to be installed in the part of FIG. 1;

FIG. 8 shows a schematic perspective view of a portion of a mesh corresponding to the pattern of FIG. 7;

FIG. 9 shows a schematic perspective view of the pattern of void volumes of a fourth embodiment of a mesh according to the disclosure to be installed in the part of FIG. 1;

FIG. 10 shows a schematic perspective view of a portion of a mesh corresponding to the pattern of FIG. 9;

FIG. 11 shows a schematic perspective view of the pattern of material volumes of a fifth embodiment of a mesh according to the disclosure to be installed in the part of FIG. 1;

FIG. 12 shows a schematic perspective view of a portion of a mesh corresponding to the pattern of FIG. 11; and FIG. 13 shows a schematic perspective view of the pattern of material volumes of a sixth embodiment of a mesh according to the disclosure to be installed in in the part of FIG. 1.

DETAILED DESCRIPTION

In the FIGURES, scales and proportions are not strictly adhered to for the sake of illustration and clarity.

A breather using the disclosure comprises, as shown in FIG. 1, a movable part 1 rotating about a longitudinal axis of symmetry X. As shown in more detail in FIG. 2, the movable part 1 comprises a structural part which comprises a first shell 2 surrounded by a second shell 3. The space between the two shells 2, 3, forms a duct 4 of revolution around the central axis of symmetry X, intended to circulate the air/oil mixture to be separated.

The duct 4 comprises an axial inlet 5 for the entrance of the air/oil mixture to be separated. This axial inlet 5 corresponds to one end of a first part 6 of the duct 4 which extends essentially axially, in order to centrifuge the mixture. The first part of the axially extending duct 6 acts as a centrifuge enclosure because this is where the centrifugal force is exerted with the greatest force on the air/oil mixture. It is therefore referred to as centrifuge enclosure 6 in the following description.

In addition, the duct 4 here also comprises a number of compartments distributed circumferentially around the axis of symmetry X. The compartments are formed by longitudinal partitions 7 extending radially. Advantageously, these longitudinal partitions 7 connect the first 2 and the second shell 3, thus forming a connection that holds them together. Each compartment communicates with the axial inlet 5 of the mixture. The axial partitions 7 form fins that rotate the mixture entering the adjacent compartments.

At its second axial end, the centrifuge enclosure 6 is closed axially by a portion 3a of the second shell 3, substantially perpendicular to the axis of symmetry X, and comprises a radial opening 9 towards the axis of symmetry X between the first 2 and the second shell 3. The second shell 3 forms a radially outer wall 3b of the centrifuge enclosure 6 which is substantially annular, between the inlet 6 and the part 3a of the second shell which axially bounds the centrifuge enclosure 6 at its second end. The centrifuge enclosure 6 comprises a plurality of radial oil outlets 8 in the form of through holes provided in the radially outer wall 3b and is configured to be able to discharge the oil separated from the mixture by the centrifugal force of the breather. Each compartment of the duct 4 is connected to one or more radial oil outlets 8.

The first shell 2 forms a radially inner wall of the compartments of the duct in the centrifuge enclosure 8. It stops axially before the axial portion 3a of the second shell 3, starting from the inlet 6 of the duct, to provide the radially inwardly opening 9 at the second end of the centrifuge enclosure 6. Its shape can be optimised to promote oil separation and to minimise pressure losses, especially at the bend formed at the radial outlet. In the example shown, the radially inner wall 2 is substantially annular from the axial inlet 5 and comprises an axial end 2a opposite the radial inlet 5 forming a rounded circumferential bead or plate at the second end of centrifuge enclosure 6. This shape of the axial end 2a of the first shell tends to return the fluid radially outwards at the passage of the bend formed in the duct 4 at the outlet of the centrifuge enclosure 6, so as to optimise the flow of the air/oil mixture flow.

The duct 4 comprises a second part 10 which communicates with centrifuge enclosure 6 through the radial opening 9 between the first 2 and second 3 shells and which is configured to guide the fluid to a radial outlet 11 in a void cylindrical space, which extends axially between the boundaries of centrifuge enclosure 6. The first 2 and the second 3 shells form collars 12, 13, which limit the void cylindrical space. These collars 12, 13 are configured to connect the part 1 to a shaft 14, shown in FIG. 1, which drives the part in rotation. The cross-section of the duct 4 in a longitudinal plane has an optimised bended shape to guide the oil-free air to the internal radial outlet 12.

The part 1 is used in a breather which comprises a pinion 15 for rotating the part, itself comprising a veil 16. In the example shown, the veil 16 is integrally connected to the moving part 1 and comprises openings opposite the axial inlet 5 for the passage of the mixture into the compartments of the duct 4. The veil 16 is also firmly connected to the hollow shaft 14.

Advantageously, the structural part of the part 1, composed of the first shell 2 and the second shell 3, is made by an additive manufacturing method which allows the complex shapes of the example to be achieved, in particular to promote the separation of oil droplets from the mixture while minimising pressure losses. The additive manufacturing can be carried out in a known manner by a controlled laser fusion process of a metal powder. However, the example presented is by no means restrictive for the implementation of the disclosure and manufacturing methods by machining or foundry can also be used for more conventional shapes of the passage duct of the mixture in the moving part 1.

According to the disclosure, the part furthermore comprises at least one honeycomb structure made by a mesh 17 in each compartment.

Advantageously, the mesh 17 does not generally extend entirely into the compartments of the duct 4. In the example shown, it extends mainly into the centrifuge enclosure 6 so as to form two distinct successive spaces in the compartment: a space 18 free of material extending only into the centrifuge enclosure 6 and a space 19 filled by the mesh 17. The free space 18 is supplied with mixture through the opening of the compartment at the axial inlet 5 and opens into the space 19 filled by the mesh 17. The space 19 filled by the mesh 17 opens into the second part 10 of the duct. The configurations shown in FIGS. 1 and 2 are not limiting. In particular, the mesh 17 can occupy a space only in a cylindrical part of the centrifuge enclosure 6, between the inlet 5 and the bend, making it easier, for example, to manufacture the part 1 by assembly by inserting the mesh 17 into the compartments of the duct 4.

As indicated by the arrow F1 in FIG. 1, the air containing oil thus enters the moving part 1 through the openings of the veil 16. In the free space 18, the longitudinal partitions 7 drive the mixture in rotation. During the passage of the flow F1 into this first part 18 of the enclosure, a first phase of de-oiling is carried out by centrifugal effect. The mesh 17 has a function of capturing the oil drops not extracted during the first phase. By centrifugal effect, the oil is evacuated to the radial outlets 8 through the mesh 17, as shown by the arrows F2. This second phase of de-oiling is also carried out in the space 19 occupied by the mesh 17 without significant pressure losses due to the axial attack of the oil drops and the structure of the mesh according to the disclosure.

The oil-free air which has passed through the mesh 17 in the duct 4 then enters the hollow shaft 14 and is discharged.

Also according to the disclosure, the mesh 17 is formed by repeating a single pattern in three spatial dimensions arranged in such a way that the voids between the material communicate so as to organise paths through the mesh material in the three spatial dimensions, the paths having bends and/or pinches and/or bifurcations. With reference to FIGS. 3 to 13, several embodiments such a mesh are presented.

According to a first embodiment, with reference to FIG. 3, the voids form a pattern in which a central sphere 20a is connected to a first series of eight cylindrical bars 20b of hexagonal cross-section, with octagonal symmetry. Furthermore, between four bars 20b of the first series, a cylindrical bar 20c of square section is connected to the sphere 20a, forming a second series of six perpendicular bars. The diameter A of the central sphere 20a is typically about 2.5 mm. The pattern repeats spatially in the three spatial directions defined by the bars 20c of the second series which connect the central sphere 20a to six other void spheres in the network of the mesh. The bars 20b of the first series connect the central sphere 20a to the eight other central spheres surrounding it diagonally in the network of the mesh. The length of the bars 20b and 20c is adjusted to obtain a very airy mesh, typically with a porosity of 90%. FIG. 4 illustrates the type of material network obtained for such a mesh. It can be seen from these FIGURES that the voids provide a passage for the fluid in several non-coplanar directions, but as the flow passes from a sphere to a bar, it encounters a cross-sectional narrowing of its passage, may be deflected in direction and/or split into several flows.

According to a second embodiment, with reference to FIG. 5, the voids form a pattern where a central sphere 21a, with a diameter A between approximately 2 mm and 2.2 mm, intersects with a series of four spheres 21b of smaller diameter, in a cubic network symmetry. The pattern of void volumes, repeated in the three directions of space, gives in addition a material network for the mesh as shown in FIG. 6. With this organisation, the porosity of the mesh is rather of the order of 85%. Here again, we see that a fluid passing from a central sphere 21b to another following one of the diagonals of the cubic network, is confronted with constrictions or pinches when passing from the central sphere 21a to an intermediate sphere 21b.

According to a third embodiment, with reference to FIG. 7, the voids form a pattern where a central sphere 22a, is connected to a series of other spheres 22b by bars 22c of cylindrical section, following the diagonals of a cubic network. Typically, the diameter A of a sphere 22a or 22b in this network is of the order of 2.5 mm. The length and cross-section of the bars is adjusted here to obtain a porosity of about 77%. FIG. 8 illustrates the type of material network that can be obtained for such a mesh. Here again, it can be seen that the passage of fluid in the different directions is pinched or constricted between the bars 22c and spheres 22a or 22b.

These first three embodiments combine high porosity, allowing a mixture loaded with droplets to pass through the mesh with a large contact surface between the material and the void, which can facilitate the capture of the droplets by the mesh.

According to a fourth embodiment, with reference to FIG. 10, the material pattern comprises a first series of bars 23a oriented in a first direction and transversely staggered, crossing a second series of bars 23b oriented in a second direction, transverse to the first direction, and also transversely staggered. For the bars from the first series of bars 23a contained in the same plane, bars from the second series 23b meet these bars 23a at a crossing point and bars 23b pass between the bars 23a. The same phenomenon occurs when the first and second series of bars are exchanged. The mesh is completed by first series of complementary 23c bars which go in a zig-zag manner in the planes of the bars 23b of the second series between two crossing points and a bar 23a of the first series crossing the plane between two bars 23b. Second series of complementary bars 23d are obtained by exchanging the role of the first 23a and the second 23b series of bars. As shown in FIG. 10, this creates an entanglement of material around the voids that communicate with each other in all directions. With reference to FIG. 9, the pattern of the void volumes thus created is quite complex, but we can see that cubic void volumes 23e, here with an edge A of between about 1.2 mm and 1.8 mm, are created, connected to stretched void volumes 23f. This pattern creates constrictions and bifurcations for the passage of fluid through the mesh in different space directions. The stretched void volumes 23f have a larger dimension equivalent to that A of the edges of the cubic void volumes 23e and a smaller dimension B of approximately 0.1 to 1 mm. The bars of the mesh are all substantially cubic in cross-section. The larger dimension A of the void volumes is substantially equivalent to the length of the bars in the pattern and the smaller dimension B is substantially equal to the edge of the bar sections. A porosity of 90% to 95% can typically be achieved by adjusting the dimensional parameters of this mesh.

In a fifth embodiment, with reference to FIG. 11, the material pattern comprises a series of bars 24a interconnected along a hexahedron. The hexahedrons are stacked in the vertical direction with reference to FIG. 11 and assembled in a hexagonal arrangement in the horizontal plane. The resulting mesh is shown in FIG. 12. The bars 24a are cylinders with a circular cross-section, but their cross-section can also be square or rectangular or be a regular polygon. The length A of the bars is usually between about 1 mm and 2 mm. The diameter B of their cross-section is usually between 0.1 mm and 1 mm. It is possible to achieve a porosity of 90% to 95% by adjusting these parameters. In this mesh, the voids between the bars provide passages for the fluid in all directions, but in each direction either the cross-section of passage between the bars changes according to the location of the pattern, or a bar 24a is interposed, separating the passage in two.

In a sixth embodiment, with reference to FIG. 13, the material pattern has a node where two bars, 25a and 25b, forming a first dihedral are connected to two other bars, 25c and 25d, forming a second dihedral rotated substantially 90 degrees to the first along a common median axis. The pattern repeats itself spatially, with the end of each bar forming a node where two dihedrons touch each other. As in the previous embodiment, bars 25a to 25d are cylinders of circular cross-section, but their cross-section can also be square or rectangular or be a regular polygon. The length of the bars is usually between 0.4 mm and 1 mm. The diameter of their section is generally between 0.1 mm and 1 mm. It is possible to achieve a porosity of 90% to 95% by adjusting these parameters. In this mesh, the voids between the bars, 25a to 25d, provide passages for fluid in all directions, but in each direction either the cross-section of passage between the bars changes according to the location of the pattern, or a bar is interposed, separating the passage in two.

Several materials are possible to make the meshes according to the disclosure. An additive manufacturing process of the mesh, for example by laser fusion of a metal powder, makes it possible to produce the patterns shown. This process also makes it possible to vary the size of the pattern according to the location in the centrifuge enclosure. In the example of part 1 shown in FIGS. 1 and 2, the one-part additive manufacture of walls 3 and 2 and the mesh allows the mesh to be placed in the space 19 around the bend of the duct. This example is not restrictive, separate fabrication of the centrifuge enclosure structure 8 and the mesh structures with final assembly is possible for other geometries of the moving part.

In variants of embodiment of the mesh 17 in the enclosure 6, it is possible to repeat the patterns along the axes by continuously varying the geometrical parameters. In this way it is possible to obtain a mesh with variable density. With regard to the axial variations, this makes it possible, for example, to capture smaller and smaller drops as the oiled air F1 moves through the mesh, limiting the effects on pressure losses. Radially, a more or less large size of the mesh pattern 17 makes it possible to even out the pressure losses between the areas close to the inner wall 2, which are little subject to centrifugal force, and the areas close to the outer wall 3, which are highly subject to centrifugal force. It is also possible to vary the size of the azimuth pattern within each compartment. As with the centrifugal force effects in the radial direction, this allows for the accumulation effects that can occur against the axial partition 7 of the compartment which is behind in relation to the direction of rotation to be taken into account.

These embodiments make it possible to adapt a mesh according to the disclosure to the shape of the duct so as to maximise the number of droplets captured while minimising the related pressure losses.

The invention claimed is:

1. A part for a centrifugal breather for an air/oil mixture of a turbomachine, the part being configured to rotate about a longitudinal axis of symmetry, the part forming an annular enclosure, the annular enclosure being for centrifugal separation of said mixture and comprising:
   an axially oriented inlet configured to feed said mixture,
   a first radially inwardly oriented outlet providing an exit of oil-free air separated from said mixture and
   at least one second radially outwardly oriented oil outlet oriented radially outwards and configured to discharge oil separated from said mixture to an area outside of the breather, the enclosure further comprising:
   at least one mesh structure occupying at least one space in a duct which closes communication between the axial inlet and the internal radial outlet, wherein the mesh structure is formed by spatial repetition of at least one of a material and a void, a single pattern being produced by an interconnection of simple shapes comprising at least one of spheres, ovoids and bars of constant section, circles, rectangles and octagons, said pattern being arranged so that the voids define paths crossing through the materials in at least three dimensions of space forming a trihedron, and in that porosity of said mesh is of 95%.

2. The part according to claim 1, wherein the mesh has a pattern that provides at least one void volume containing one of a sphere and a square, the sphere having a diameter and the square having a side, respectively, of between 1 mm and 2.5 mm, or in that the longitudinal extension of a material element of the pattern is between 1 mm and 2.5 mm.

3. The part according to claim 1, wherein a transverse dimension of a at least one of a void element and a material element is between 0.1 mm and 1 mm.

4. The part according to claim 1, wherein the pattern is formed by spheres intersecting with a central sphere.

5. The part according to claim 1, wherein the pattern is formed by bars intersecting with a central sphere and wherein a sphere of smaller diameter than the central sphere being connectable to at least one of said bars.

6. The part according to claim 1, wherein the pattern comprises a first series of bars oriented in a first direction and transversely staggered, having points of crossing with a second series of bars oriented in a second direction, transverse to the first direction, also transversely staggered, the pattern further comprising series of complementary bars connecting, in a zig-zag manner, crossing points in a row of bars of the first series, respectively the second series, with bars of the second series, respectively the first series, crossing said row, to create a entanglement of material around the voids.

7. The part according to claim 1, wherein the pattern comprises bars interconnected in hexahedrons.

8. The part according to claim 1, wherein the pattern comprises a node in which a first two bars forming a first dihedron are connected to a second two bars forming a second dihedron rotated 90 degrees relative to the first dihedron along a common median axis.

9. A centrifugal breather for an air/oil mixture of a turbomachine comprising the part according to claim 1, a hollow shaft being integral with said part, the hollow shaft being configured to collect the oil-free air exiting the internal radial outlet, and a pinion configured to rotate the centrifugal breather.

* * * * *